March 25, 1958   J. A. BOUILLIANT-LINET   2,827,746
TRACTOR MOUNTED RECIPROCATING CUTTING ASSEMBLY
WITH TORQUE TUBE MOUNTING MEANS
Filed Jan. 23, 1953   3 Sheets-Sheet 1

INVENTOR.
JACQUES ACHILLE BOUILLIANT LINET
BY
Carlson, Pitzner, Hubbard & Wolfe
ATTORNEYS.

March 25, 1958 J. A. BOUILLIANT-LINET 2,827,746
TRACTOR MOUNTED RECIPROCATING CUTTING ASSEMBLY
WITH TORQUE TUBE MOUNTING MEANS
Filed Jan. 23, 1953 3 Sheets-Sheet 2

INVENTOR.
JACQUES ACHILLE BOUILLIANT LINET
BY
Carlson, Pitzner, Hubbard & Wolfe
ATTORNEYS.

INVENTOR.
JACQUES ACHILLE BOUILLIANT LINET
BY
Carlson, Pitzner, Hubbard + Wolfe
ATTORNEYS.

United States Patent Office 2,827,746
Patented Mar. 25, 1958

2,827,746

TRACTOR MOUNTED RECIPROCATING CUTTING ASSEMBLY WITH TORQUE TUBE MOUNTING MEANS

Jacques A. Bouilliant-Linet, Garches, France

Application January 23, 1953, Serial No. 332,847

Claims priority, application France January 24, 1952

5 Claims. (Cl. 56—25)

The present invention relates to mowers, and more particularly to a mowing attachment for mounting on the side of a tractor.

It is an object of the present invention to provide a side-mounted mower having improved and simplified means for mounted the cutter bar with respect to the tractor. It is another object to provide a side-mounted mower having novel means for swinging the cutter bar upwardly into vertical transport position as an incident to raising it bodily above the ground.

It is a further object of the invention to provide a mower for mounting on the side of a tractor in which the cutter bar is firmly anchored in its mowing position and which has a novel provision for lost motion, enabling the cutter bar to follow irregular surface contours. It is a related object to provide a mower having a novel frame construction and high inherent strength and rigidity, but which is nevertheless simple, inexpensive and relatively light in weight. It is another object to provide a side-mounted mower which forms a rigid and compact unit with the tractor, but which may be quickly and easily detached from the tractor to enable the latter to be used for other purposes.

It is another object of the invention to provide a mower for mounting on the side of a tractor which includes novel means for maintaining the cutter bar bodily upraised for transport.

It is a further object to provide a side-mounted mower having a novel arrangement for both supporting the mower on the tractor and for conveying power thereto from the tractor power take-off.

Other objects and advantages of the invention will become apparent upon reading the attached description taken in connection with the drawings, in which Figure 1 is a plan view of an illustrative form of mower constructed in accordance with the invention, the mower being shown as side-mounted on a tractor and with the tractor indicated in dot-dash outline.

Figure 1:
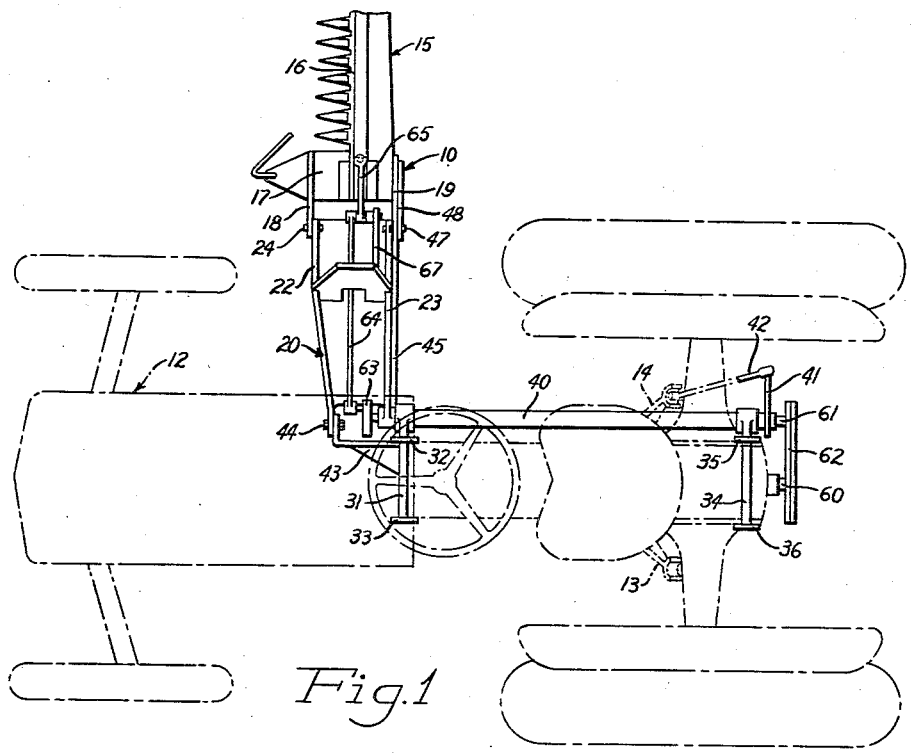

While the invention is susceptible of various modifications and alternative constructions, there is shown in the drawings and will herein be described in detail the preferred embodiment, but it is to be understood that it is not intended to limit the invention to the form disclosed, but it is intended to cover all modifications, alternative constructions and equivalents falling within the spirit and scope of the invention, as expressed in the appended claims.

Figure 2:
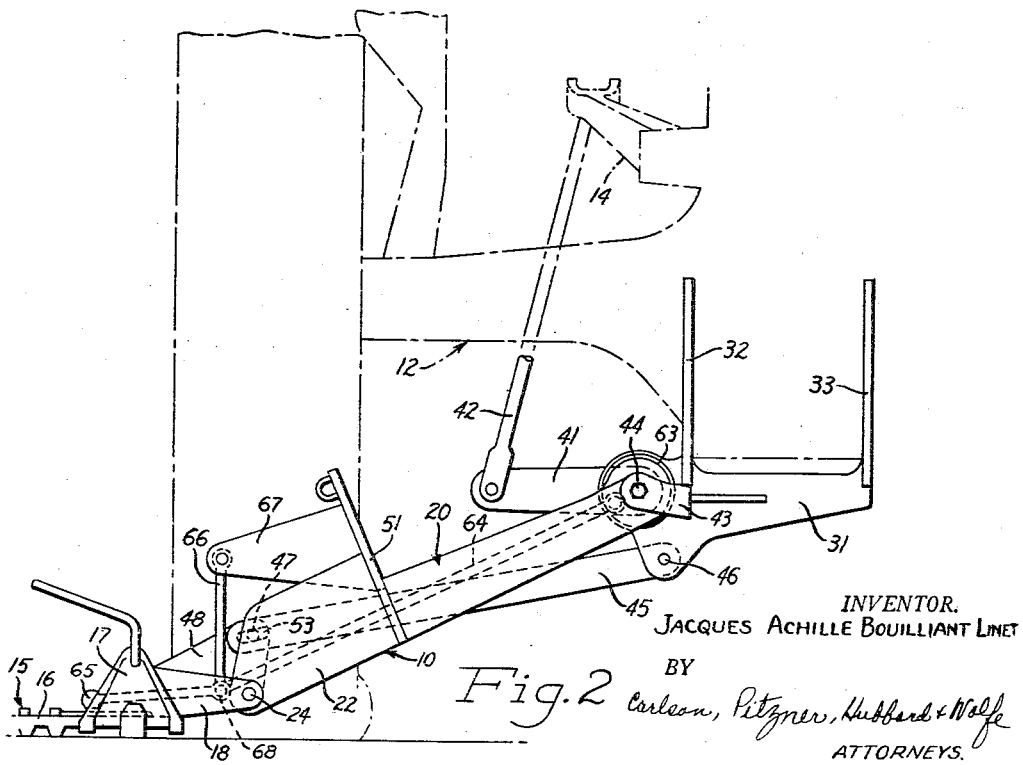
Fig. 2 is an enlarged front elevation of the mower of Fig. 1, and with the cutter bar in its lowered position.

Referring now to Figs. 1 and 2, there is shown an illustrative embodiment of the invention comprising a mower or mower attachment 10 mounted on the right-hand side of a tractor 12. In this instance the tractor 12 will be recognized by those skilled in the art as a Ferguson, having power lift arms 13, 14 and as shown in the Ferguson U. S. Patent 2,118,180, but the invention is of course applicable to mowers for use with various types of tractors or tractive vehicles.

As shown in the drawings, the mower includes a cutter bar 15 having a reciprocating knife 16. At the inner end of the cutter bar is a shoe 17 having a pair of supporting brackets 18, 19, which are spaced fore and aft and arranged parallel to one another, as shown in Fig. 1.

Interposed between the tractor and the cutter bar is a drag bar 20. This drag bar is pivoted for upward swinging movement about an axis 21 which extends longitudinally of the tractor and which is located close to the tractor body. The drag bar is channel-shaped in cross-section, providing a pair of spaced walls 22, 23. The spaced walls respectively engage the brackets 18, 19, and have a pivot connection 24 therewith to enable the cutter bar to fold upwardly with respect to the drag bar.

Figure 4:
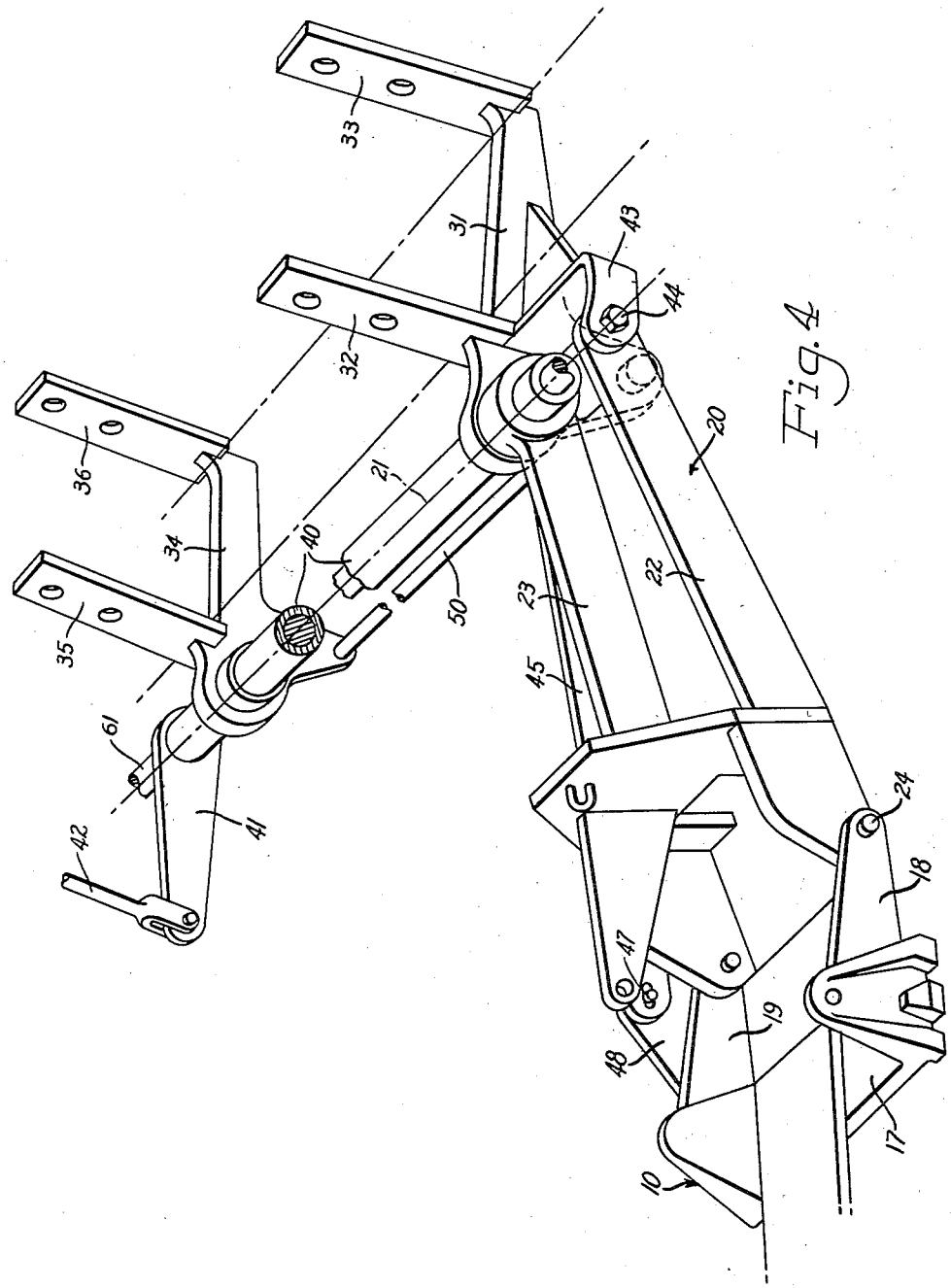
Fig. 4 is an enlarged perspective view of the mower drag bar assembly and the means for mounting the same on the tractor.

Attention may next be given to the means for mounting the drag bar. As shown in Figs. 1 and 4, a first supporting member 31 is mounted at about the center of the tractor. This supporting member extends transversely and has a pair of upwardly extending brackets 32, 33, which are bolted to the sides of the tractor frame. A generally similar supporting member 34 is employed at the rear of the tractor, having upwardly extending brackets 35, 36. Journaled in the supporting members 31, 34 along the axis 21 is a tubular torque shaft 40.

The drag bar 20 is rigidly connected to the forward end of the torque shaft 40 for rotation therewith, and means are provided at the rear end of the torque shaft for applying torque from the tractor hydraulic lift mechanism. In the present instance lifting torque is applied to the shaft 40 by means of an arm 41 and connecting link 42, the link 42 being connected at its upper end to one of the tractor lift arms 14. It will be apparent therefore that when the power lift mechanism is actuated, the drag bar will be swung upwardly relative to the tractor about the axis 21. In order to provide additional support for the drag bar, a bracket 43 is provided on the forward support, having a pivot 44 which is coaxial with the axis 21.

In practicing the present invention an operating link is provided which extends between the tractor and the shoe of the cutter bar and which is pivoted at points which are offset from the pivot axes of the drag bar so that the cutter bar folds upwardly when the drag bar is raised. In the present instance this is accomplished by an operating link 45. This operating link is pivoted at its inner end at a pivot 46 (Figs. 2, 3) which lies below the pivot axis 21 of the drag bar. At its outer end the operating link is pivoted with respect to the cutter bar shoe 17 at a pivot 47 which lies above the pivot axis 24 which is common to the drag bar and cutter bar. The pivot point 47 is carried on an upstanding bracket 48.

In accordance with one of the more detailed aspects of the invention, the operating link 45 is spaced rearwardly of the drag bar 20, and pivoting of the operating link occurs about a longitudinally extending shaft 50, which is arranged below and parallel to the tubular shaft 40. The shaft 50 is anchored at its ends on the supporting members 31, 34.

Figure 3:
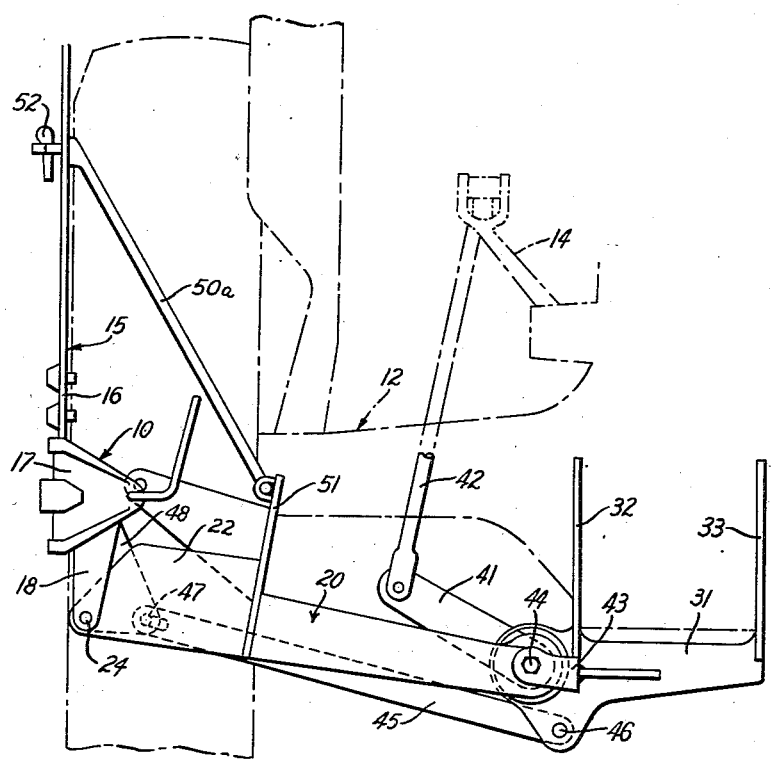
Fig. 3 is an enlarged front elevation similar to Fig. 2, but showing the cutter bar upraised for transport.
Figure 6:
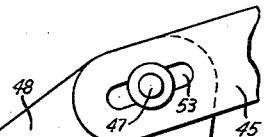
Fig. 6 is an enlarged fragmentary front view showing the lost-motion connection at the cutter bar shoe.
Figure 5:
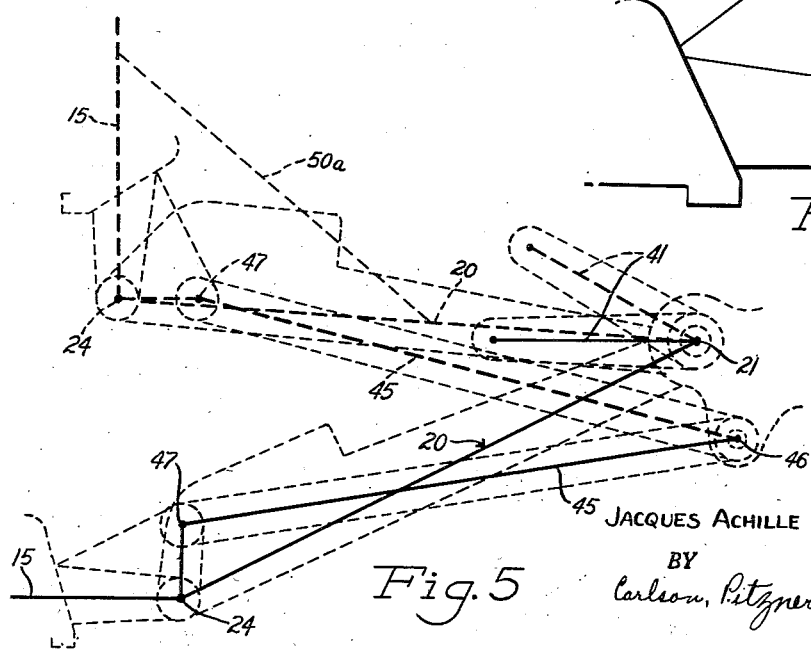
Fig. 5 is a diagram of the operating linkage and showing the cutter bar in its lowered and upraised positions.

The relative movements which occur upon raising the cutter bar will be apparent upon comparing Figs. 2 and 3 and upon reference to the diagram, Fig. 5. In Fig. 2 the mower is shown in its normal cutting position with the cutter bar 15 lowered into contact with the ground, Under such conditions the operating link 45 and drag bar 20 define a quadrilateral linkage having pivot points 21, 24, 46, 47 and with the operating link and drag bar crossing one another at a shallow angle.

When clockwise torque is applied to the crank 41 at the rear of the tractor, torsion is transmitted along the tubular shaft 40 and the drag bar is swung upwardly relative to the tractor. Since the pivot points 21, 46 and 24, 47 are respectively offset from one another, relative movement occurs between the outer end of the drag bar and outer end of the operating link, the operating link being, in effect, shortened as the drag bar is swung upwardly. This shortening effect causes the operating link 45 to apply clockwise torque to the cutter bar so that the latter is swung upwardly into vertical position in addition to being bodily raised by the drag bar. With the cutter bar upraised as shown in Fig. 3, it will be apparent to one skilled in the art that the mower may be transported without any risk of striking obstructions on the ground.

Means are provided for maintaining the cutter bar upraised as in Fig. 3 independently of the tractor power lift. This is accomplished by providing a tie rod 50A between the cutter bar and drag bar. This tie rod is connected at its inner end on a bracket 51, which extends upwardly from the drag bar. At its outer end the tie rod is fastened to the midportion of the cutter bar by a removable pin 52. After the tie rod is in place, the force on the arm 41 and connecting rod 42 may be released. The effect of the tie rod is to rigidify the quadrilateral linkage 21, 24, 46, 47 so that the entire assembly is locked in upraised or transport position relative to the tractor, and no separate locking mechanism is required to lock the tubular shaft 40. To lower the mower, the power lift mechanism is first "raised" to relieve the tension on the tie rod so that it can be easily removed. Subsequent "lowering" of the power lift causes the mower assembly to be restored to the working position of Fig. 2.

In order to permit the cutter bar to follow the undulations of the ground during mowing, a lost-motion connection is provided in the quadrilateral linkage. In the present instance lost-motion is produced by a slot 53 formed in the operating link 45. It will be understood that when the cutter bar is locked in its upraised position by the tie rod 50A, the lost-motion is completely taken up and does not affect the rigidity of the cutter bar support.

For the purpose of driving the knife 16 of the cutter bar, power is transmitted from the tractor power take-off through a drive shaft 61 which is telescoped in the tubular torque shaft 40. Referring to Fig. 1, the power take-off is indicated at 60 at the rear of the tractor, and is connected by V-belts 62 or the like to the drive shaft 61. At the forward end of the shaft 61 is a crank 63 having a pitman 64. The latter is received between the opposed walls of the drag bar and is connected to the knife 16 at its lower end through a short connecting link 65. The pitman 64 is supported at its lower end by a drop link 66 hung from a bracket 67 (Fig. 2). The pitman 64 and links 65, 66 are preferably interconnected at a point 68 which lies in the region of the main cutter bar pivot 24.

With the reciprocating linkage arranged as described above, it will be apparent that it in no way restricts movement of the cutter bar and drag bar into their transport position. In addition, the nesting of the linkage in the drag bar causes it to be shielded against damage and against entanglement with tall weeds or other passing objects.

Although the mower construction described above is extremely simple, it will be appreciated nevertheless that it affords a high degree of strength and rigidity. It is to be noted, for example, that the drag bar itself, being of channel-shaped cross-section, resists the backward thrust of the earth and stubble against the cutter bar. The device is furthermore very straightforward in appearance and operation, being free of cables, pulleys and other auxiliary elements commonly used in side-mounted mowers. The mounting provides very close coupling to the tractor, so that the mower and tractor together form a compact unit. The mower may, nevertheless, be removed simply by unscrewing the bolts which mount the brackets 32, 33 and 35, 36 to the tractor and by disconnecting the lift arm and power take-off.

What is claimed is:

1. In a mower for use with a tractor having a power lift device at its rear end, the combination comprising a longitudinal torque shaft extending from the rear end of the tractor to the mid-portion thereof, means at the ends of the torque shaft for rotatably mounting the same closely alongside the tractor, a drag bar rigidly connected to the forward end of the torque shaft for bodily swinging movement therewith and extending laterally outwardly therefrom, means at the rear end of the torque shaft for coupling the same to the power lift device on the tractor, a laterally extending cutter bar, a hinge connection mounting the cutter bar on the outboard end of the drag bar to enable upward folding movement of the cutter bar thereon, and means connected to the cutter bar and actuated by upward swinging of the drag bar relative to the tractor for causing said cutter bar to be folded up into a vertical position in unison with movement of the drag bar to its generally horizontal position upon application of torque by said power lift device.

2. In a mower for use with a tractor, the combination comprising a drag bar, means including a drag bar pivot for mounting the drag bar on the tractor so that it extends laterally outward, torque-applying means coupled to the drag bar for swinging said drag bar upwardly in a vertical plane, a laterally extending cutter bar, a pivot mounting the cutter bar on the outboard end of the drag bar to enable upward folding movement of the cutter bar with respect thereto, and an operating link having one end pivotally anchored with respect to the tractor at a point radially offset from the drag bar pivot thereon and having its other end connected to the cutter bar at a point radially offset from the cutter bar pivot so that the cutter bar is folded upwardly as an incident to upward swinging movement of the drag bar.

3. In a mower for use with a tractor, the combination comprising a drag bar, means including a drag bar pivot for mounting the drag bar on the tractor so that it extends laterally outward, torque applying means coupled to the drag bar for swinging said drag bar upwardly in a vertical plane, a laterally extending cutter bar, a pivot mounting the cutter bar on the outboard end of the drag bar to enable upward folding movement of the cutter bar with respect thereto, and an operating link having one end pivotally anchored with respect to the tractor at a point lying below the drag bar pivot thereon and having its other end connected to the cutter bar at a point lying above the cutter bar pivot so that the cutter bar is folded upwardly as an incident to upward swinging movement of the drag bar.

4. In a mower for use with a tractor, the combination comprising a laterally extending drag bar, means including a hinge connection at the inboard end of the drag bar for anchoring the same to the midportion of the tractor for upward swinging movement, torque-applying means coupled to the drag bar for swinging said drag bar upwardly, a cutter bar, a hinge connection mounting the cutter bar on the outboard end of the drag bar to enable upward folding movement of the cutter bar thereon, an operating link having one end anchored with respect to the tractor at a point radially offset from the hinge axis of the drag bar and having its other end connected to the cutter bar at a point radially offset from the hinge axis of the cutter bar forming a quadrilateral linkage causing the cutter bar to be folded upwardly as an incident to upward swinging movement of the drag bar, and a detachable tie rod connected at one end to the body of the cutter and at its other end to the body of the drag bar when the latter are upraised so that the quadrilateral linkage is rigidified thereby maintaining the cutter bar upraised for transport independently of the torque-applying means.

5. In a mower for use with a tractor, the combination comprising a laterally extending drag bar, means including a hinge connection at the inboard end of the drag bar for anchoring the same to the tractor for upward swinging movement, torque-applying means coupled to the drag bar for swinging said drag bar upwardly, a laterally extending cutter bar, a hinge connection mounting the cutter bar on the outboard end of the drag bar to enable upward folding movement of the cutter bar thereon, an operating link having one end anchored with respect to the tractor at a point radially offset from the hinge axis of the drag bar and having its other end connected to the cutter bar at a point radially offset from the hinge axis of the cutter bar for forming a quadrilateral linkage causing the cutter bar to be folded upwardly as an incident to upward swinging movement of the drag bar, said operating link including a lost-motion connection for permitting said cutter bar to follow the undulations of the ground when in working position.

References Cited in the file of this patent

UNITED STATES PATENTS

| | | |
|---|---|---|
| 1,758,527 | Maine | May 13, 1930 |
| 2,304,421 | Rogers | Dec. 8, 1942 |
| 2,311,095 | Simpson et al. | Feb. 16, 1943 |
| 2,311,117 | MacDonald et al. | Feb. 16, 1943 |
| 2,496,608 | Thomas | Feb. 7, 1950 |
| 2,545,100 | McIntyre | Mar. 13, 1951 |
| 2,582,513 | Swafford | Jan. 15, 1952 |
| 2,700,263 | Goss | Jan. 25, 1955 |